(No Model.)
W. K. FREEMAN.
ARMATURE FOR DYNAMO ELECTRIC MACHINES OR MOTORS.
No. 302,555. Patented July 29, 1884.
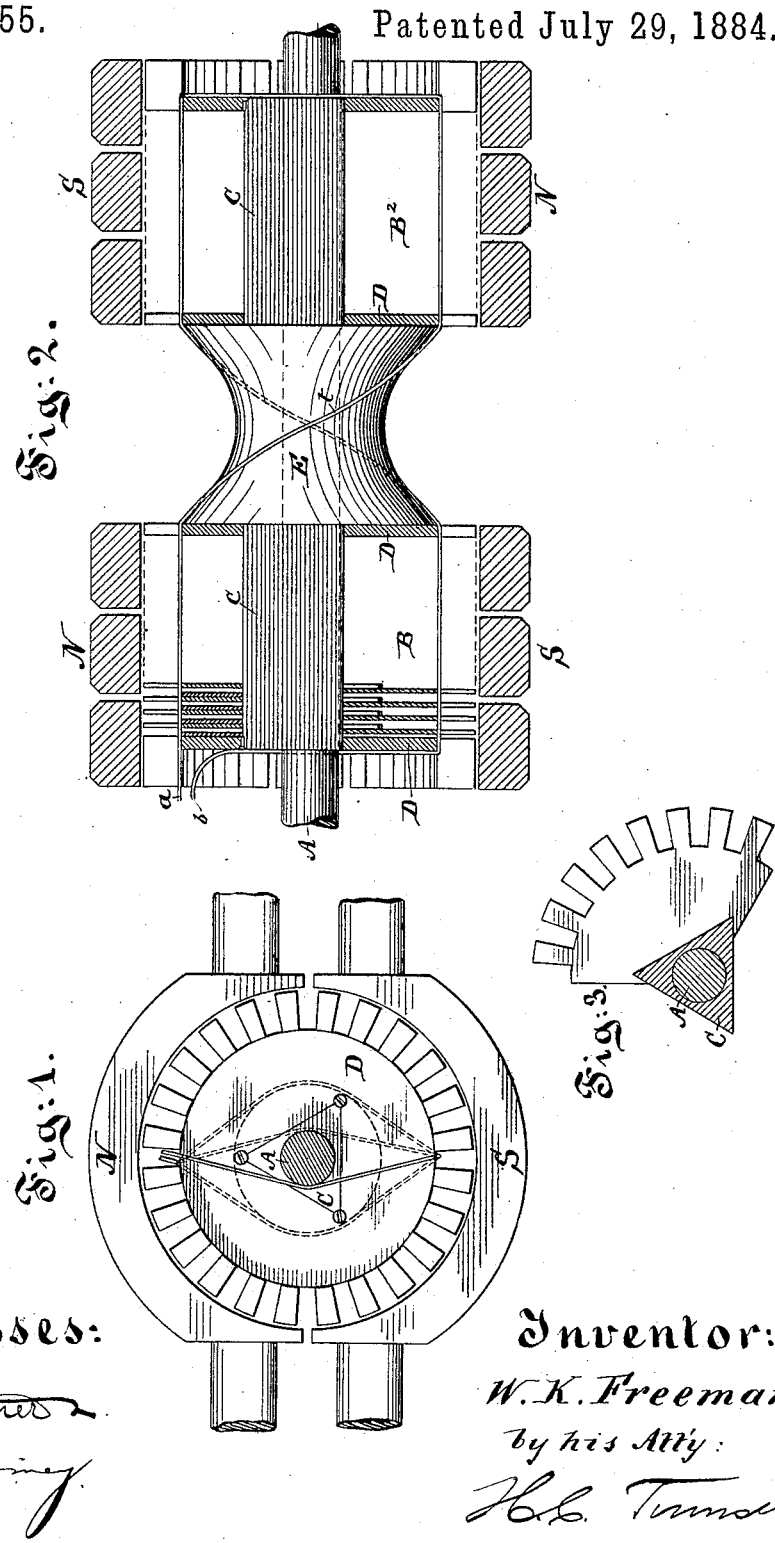

United States Patent Office.

WALTER K. FREEMAN, OF BROOKLYN, NEW YORK, ASSIGNOR TO THE MONARCH ELECTRIC COMPANY OF NEW YORK.

ARMATURE FOR DYNAMO-ELECTRIC MACHINES OR MOTORS.

SPECIFICATION forming part of Letters Patent No. 302,555, dated July 29, 1884.

Application filed November 15, 1883. (No model.)

*To all whom it may concern:*

Be it known that I, WALTER K. FREEMAN, a citizen of the United States, and a resident of Brooklyn, in the county of Kings and State of New York, have invented certain new and useful Improvements in Armatures for Dynamo-Electric Machines or Motors, of which the following is a specification.

My invention relates to that portion of dynamo-electric machines known as the "armature" or "carrier," and more especially to those forms of armature or carrier called "cylindrical" or "ring" armatures," having the armature coils or wires wound over and over upon their exterior, after the manner of the coils in a Siemens dynamo-electric machine.

My invention consists of a novel compound armature composed of two or more cylindrical carriers or cores mounted on the same armature-shaft, and wound with a coil or coils of wire connected together in a single system, in the manner hereinafter described, so that the current generated in the portions of a coil in one carrier may flow directly to and through the portion of said coil or wire upon the other carrier without the intervention of a commutator or other similar collecting device.

My invention also consists in certain combinations and details of construction that will be described, and then specifically pointed out in the claims.

In the accompanying drawings, Figure 1 is an end view of an armature made according to my invention. Fig. 2 is a longitudinal section of the same. Fig. 3 is a detail view.

A indicates an armature-shaft, upon which are mounted two cylindrical armature-carriers, B B², each constructed in any desired way, but by preference made up of a series of thin overlapping sector-shaped plates slipped upon a triangular portion, C, of the shaft, and held in place thereon by a dovetail connection made by cutting the inner ends of the plates, as shown in the detail view, Fig. 3. D D indicate flanges or plates, between which the series of sector-shaped plates are held; and E, an intermediate hub between the two carriers. Said hub forms a bearing or support for the armature-wire where it passes from the one side of one carrier to the opposite side of the other.

N N S S indicate field-of-force pole-pieces of any desired construction, and formed by a field-of-force magnet system of any desired kind. In the present instance the pole-pieces are shown as slotted to allow free circulation of air about the armature. The pole-pieces have the polarity indicated by the letters N S, and each pair N S forms the field of force for one of the carriers or armatures B or B². The manner of winding my compound armature or armatures is illustrated by the single strand of wire in place. Starting with the end $a$ of said strand, which end may be the connection to a commutator, to another bobbin, or to another strand, according to the particular system of winding and connection adopted, the wire is laid first upon, say, the upper side of carrier B, is then brought across diagonally at $t$ over the hub to the opposite side of carrier B², is laid along the opposite or lower side of said carrier, across the end thereof, along the upper side, then diagonally over the hub on the opposite from $t$ to the under side of carrier B and to terminal $b$, from which point the winding is repeated in the same path, as usual; or connection is made to the commutator or to the coils of some other bobbin or division of the armature, according to the system of connection and winding adopted. Any number of carriers may be arranged on the same shaft, and their armature-wires may form continuations of the same winding or coil, as herein described, so that the current generated by the passage of the armature-wire upon one carrier through its magnetic field of force shall combine directly with that upon another carrier on the same shaft without passing through a commutator.

It is obvious that the connection $t$ may be any device whereby a direct electrical connection is formed between the armature-wire upon the two carriers.

I do not limit myself to any particular construction of armature-carrier. That herein shown is the subject of another application for patent filed by me.

What I claim as my invention is—

1. In a dynamo-electric machine or motor, the combination of two or more cylindrical carriers mounted on the same shaft, and having armature-wire upon one forming a direct continuation of that upon the other, as described, and two field-of-force pole-pieces, N S, presented to each cylindrical carrier on opposite sides thereof, as and for the purpose described.

2. In a dynamo-electric machine, a compound armature composed, as described, of two or more separate cylindrical carriers mounted on the same armature-shaft, and armature-wire laid, in the manner described, upon one side of one carrier, then upon the opposite side of the other carrier.

3. The combination, with the two cylindrical carriers on the same armature-shaft, of the intermediate hub, the two fields of force, and the continuous armature-wire laid, in the order described, upon the top of one carrier, the bottom of the second, the top of the latter, and the bottom of the first.

Signed at New York, in the county of New York and State of New York, this 13th day of November, A. D. 1883.

WALTER K. FREEMAN.

Witnesses:
THOS. TOOMEY,
GEO. C. COFFIN.